Jan. 3, 1928. 1,655,018
C. H. LOUTREL
COMPRESSION SPRING WASHER
Original Filed Dec. 7, 1926
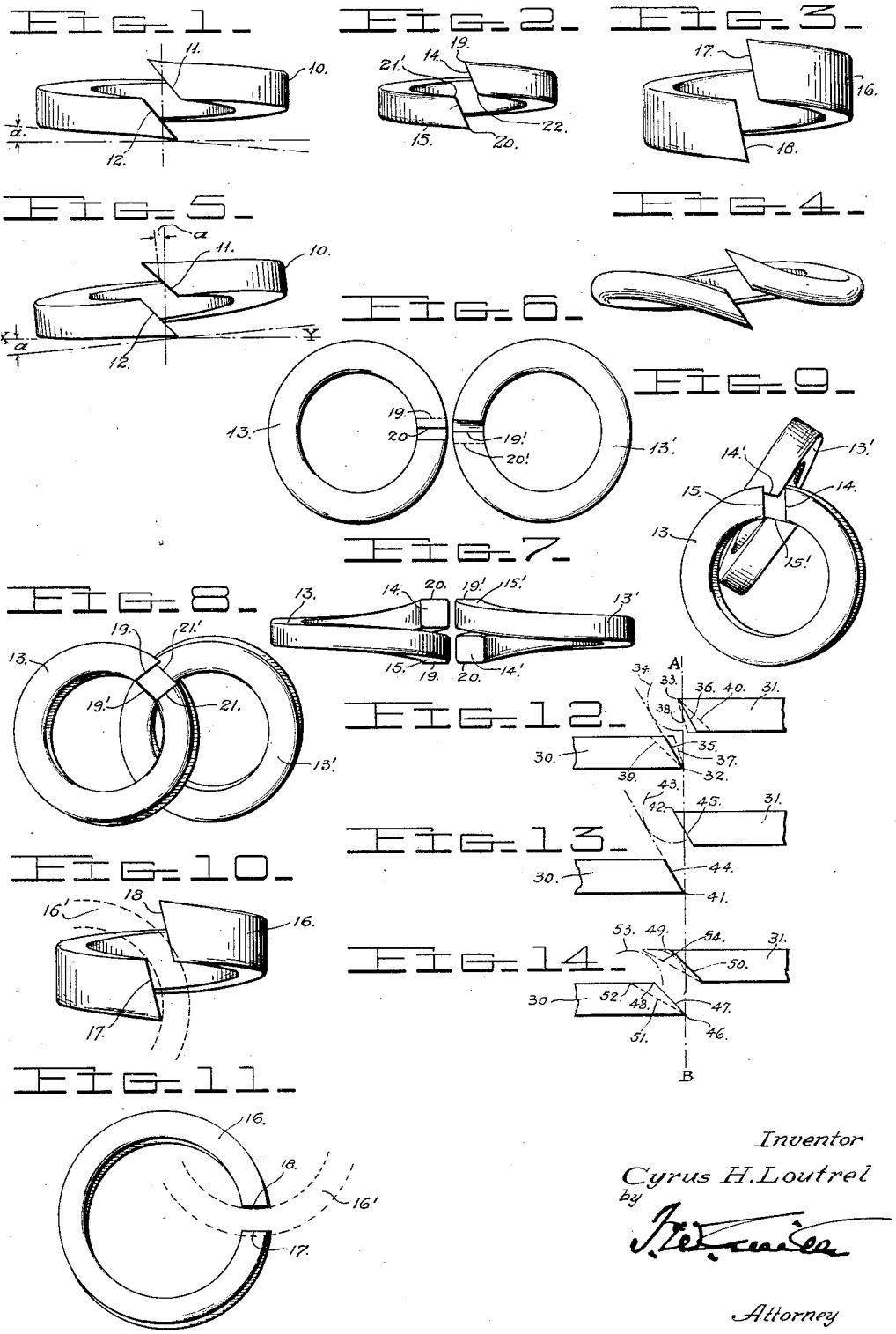
Inventor
Cyrus H. Loutrel
by
Attorney Patented Jan. 3, 1928.

1,655,018

UNITED STATES PATENT OFFICE.

CYRUS H. LOUTREL, OF SOUTH ORANGE, NEW JERSEY, ASSIGNOR TO THE NATIONAL LOCK WASHER COMPANY, OF NEWARK, NEW JERSEY, A CORPORATION OF NEW JERSEY.

COMPRESSION SPRING WASHER.

Substitution for application Serial No. 153,135, filed December 7, 1926, and in Canada December 13, 1926.
This application filed November 4, 1927. Serial No. 231,063.

This invention relates to compression spring washers of the split ring type which are in the general form of a helical segment, the present application being filed in substitution and continuation of my application filed December 7, 1926, Ser. No. 153,135.

As such split ring washers have heretofore been made and used in practice, the ends of the segment have been in such relation to each other that the washers, when handled in bulk, readily interlink with each other. Hence, before they can be used, they must be disentangled and this involves labor and expense.

It is the object of my invention to provide washers of this type which will interlink, if at all, under only exceptional circumstances and, preferably, washers which will not interlink under any circumstances.

In the annexed drawings, Figures 1, 2, 3 and 4, show illustrative embodiments of my invention as applied to several types of washers commonly in use, to show how the invention may be applied to any type of washer. Figure 1 is a washer with a stock cross section wider than it is high; Figure 2 is a washer with a substantially square cross section of stock; Figure 3 is a washer with a stock cross section which is higher than it is wide; Figure 4 is a washer with deformations in its area; Figure 5 is the same washer as shown in Figure 1, with the washer turned into a somewhat different position from that in Figure 1; Figures 6 and 7 are respectively the plan and side elevation of a pair of such washers as shown in Figure 2, illustrating a manner of approach of a pair of washers which will cause interlinking with washers as now used in practice, and at the same time, showing that washers constructed in accordance with my invention will not interlink in this manner; Figure 8 is a perspective of a pair of washers such as shown in Figure 2, illustrating another manner in which a pair of washers may be approached toward each other so that, if the washers are of the type as heretofore used in practice, interlinking will occur (this manner being called the "third manner" hereinafter), but in which interlinking is prevented when the washers are constructed in accordance with my invention; Figure 9 is a pair of washers such as shown in Figure 2, illustrating still another manner in which a pair of washers may be approached toward each other so that, if the washers are of the type heretofore used in practice, interlinking will occur (this manner being called the "fourth manner" hereinafter) but in which interlinking is prevented when the washers are constructed in accordance with my invention; Figures 10 and 11 are more or less diagrammatic views showing the necessary relation of the faces of the ends of the washers such as shown in Figure 3, if interlinking is to be prevented by movement of the side of the washer through the space between the ends of the segment; Figures 12, 13 and 14 are diagrams illustrating, in general, the relation between the angles of the ends of the segments and the distances between them.

Like reference characters indicate like parts in the several views.

In the illustrative embodiment shown in Figure 1, my invention is applied to a well known type of washer. The washer 10 is a helical segment of not less than 360° in circumference, formed of a washer stock substantially rectangular in cross section with the smallest dimension in the direction of the height of the washer, the pitch of the helix being slightly greater than the height or thickness of the washer stock. The ends are cut at angles of about 45° to the top and bottom of the washer, the faces 11 and 12 lying in substantially parallel planes whose intersections with the top and bottom of the washer stock form substantialy straight lines across the top and the bottom of the washer, extending more or less radially to the helix. The faces 11 and 12 are spaced apart so that the washer may be compressed and preferably, as in the form shown, are positioned relatively so that, even if the washer is compressed until it is flat, the faces will not contact to a material extent before the washer is flat. The distance between faces 11 and 12 is less, however, than the smallest dimension of the cross section of the washer stock, which, in the illustrative form of Figure 1, is the thickness or height of the washer stock.

In the illustrative embodiment shown in Figure 2 of my invention applied to another well-known type of washer, the washer 13 is made from a substantially square stock and the end faces 14, 15, make an angle of about 60° with the top and bottom, respectively, of the washer. Otherwise, the washer is, in general, the same as shown in Figure 1.

In the illustrative embodiment shown in Figure 3 of my invention applied to still another well-known type of washer, the washer 16 is made from a stock of a substantially rectangular section, with the greatest dimension in the direction of the height of the washer, and the faces 17, 18, making an angle of about 75° with the top and bottom, respectively, of the washer. Otherwise, the washer is, in general, the same as shown in Figure 1.

In Figure 4, I have shown my invention applied to a well-known form of washer which has deformations in its areas.

If a plurality of washers, all of the same kind, and made in accordance with my invention in any of the forms, for instance, of Figures 1, 2, 3, or 4, is handled in bulk, they will not interlink; in other words, they will not become entangled.

I have found that washers of the split ring type, as heretofore used in practice, become entangled because the segments are less than 360° in circumference. Consequently, if two such washers are approached toward each other so that the end faces of the segments (which, in practice, make right angles with the top and bottom of the washer) are in approximate alinement, the ends of the respective washers can pass each other and thus the washers will interlink. For convenience, this may be considered the first manner in which interlinking may occur, and I have found that this will be prevented if the segments are more than 360° in circumference. But this change alone would destroy the functioning of the washer, because the ends of the segment would then overlap and prevent the compression of the washer.

To overcome this difficulty, I cut the ends so that the end faces make an angle with the top and bottom of the washer, the faces preferably being flat and parallel for ease of manufacture, the faces being arranged so that, although the segment is more than 360° in circumference, the faces will not contact, at least to a material extent, even if the washer is fully compressed or flattened.

I have found, however, that the space between the end faces which this arrangement produces, must be made small enough, if interlinking is to be avoided, to prevent any part of a washer being moved through this space, and for convenience, this may be considered the second manner in which interlinking may occur. If the distance between the end faces of the segment is less than the smallest dimension of the washer stock, entangling in this manner will be prevented. Thus, if the space between faces 11, 12, of Figure 1 is less than the height of the washer stock, it will be clear that another like washer cannot be passed sidewise through this space. The same is also obviously true of the washers of Figures 2 and 3.

In the case of washers made as in Figure 3, with the longest dimension of the washer stock extending in the direction of the height of the washer, the theoretical maximum distance between the end faces which will prevent interlinking in this manner may be somewhat greater than the width of the washer stock, because of the curvature of the circumference of the washer. This will be understood readily by an inspection of Figures 10 and 11, in each of which I have shown the positions in which two washers, such as illustrated in Figure 3, are placed to determine the maximum permissible distance between the end faces to prevent interlinking in this manner. In each case, it will be seen that the curvature of the washer makes this permissible maximum distance somewhat greater than the width of the washer stock. This difference, with washers of any ordinary dimensions, will be so small that it may be disregarded, and, to simplify the language in this description and the appended claims, I describe the maximum permissible space between the end faces of any washer embodying my invention as less than the smallest dimension of the washer stock cross section, including in that expression the maximum permissible distance between faces of such washers as shown in Figure 3 as indicated in Figures 10 and 11.

It will also be understood that, in practice, even if the space between the segment end faces measures exactly the same as the smallest dimension of the cross section, nevertheless a washer cannot be passed through the space, because the end surfaces and sides of the washer stock are not sufficiently smooth to permit such passage. When, therefore, I specify that such space must be less than such smallest dimension, it will be understood that I mean such a space as will, in practice, prevent the passage of a washer through such space in this manner.

In Figures 6 and 7, I have illustrated how washers embodying my invention, when approached in the manner which will produce interlinking with the washers as heretofore made in practice, will not interlink. In these figures, the washers are those illustrated in Figure 2. It will be seen that, even if the edge 19' of one washer and the edge 20 of the other washer are positioned so that they can pass each other, such passing will be prevented by contact of the adjacent sides of the two washers at the opposite ends of the segments, since the edges 20 and 19' are not in alinement. This is because the segments are more than 360° in circumference.

In determining the minimum circumference of the segment which is permissible, the washer should be turned from the position shown in Figure 1, wherein the axis of the helix is vertical, through the angle $a$ (the pitch angle of the helix) into the position shown in Figure 5. Then the ends of the segment are projected on the line X—Y and if the combined circumference of the top and bottom of the washer thus projected is greater than 360°, the washers will not interlink when approached as shown in Figures 6 and 7. Therefore, when I specify the length of the segment as being more than 360° in circumference, it is to be understood that I mean the circumference as thus determined with the washer in the position of Figure 5.

Washers, formed as illustrated, with the circumference not less than 360° and with the space between the end faces even slightly less than the smallest dimension of the washer stock, will not interlink in either of the manners already described and washers thus made would seldom, if at all, become entangled.

There is, however, a third manner in which washers of the general forms illustrated may interlink unless the segment ends are arranged to prevent this. In this third manner, the washers are moved toward each other as shown in Figure 8. In this figure, the line of sight is parallel to the several end faces of the segments and the washers are those illustrated in Figure 2. When thus approached, the washers may interlink, if the dimensions of the washer stock, the helical pitch, the angle of the end faces and the distance between these faces are such that no part of one washer interferes with the movement of the other washer parallel to the line of sight in Figure 8. Such a condition may exist even though the distance between the faces is somewhat less than the smallest dimension of the washer stock. Obviously, the chance of the washers thus being approached toward each other in handling such washers in bulk is fairly remote, but, if it is desired to have washers which will not entangle under any circumstances, then it is necessary to construct the washers so that they cannot be interlinked in this third manner, and this can be readily accomplished by making the space between the end faces of the segment such that edge 21' of washer 13' in Figure 8 is under a part of washer 13 when edge 19' of washer 13' is against the inner edge of washer 13; in other words, so that, while edge 19' is free to pass washer 13, edge 21' is not. This relationship may also be brought about by increasing the length of the segment.

Similarly, there is a fourth manner in which such washers may be entangled, unless constructed to prevent it. This is shown in Figure 9, in which two washers like Figure 2 are positioned with the face 15' of washer 13' against the inside of washer 13 adjacent the space between the end faces of washer 13. The line of sight in this figure is parallel to the several end faces of the segments. It will be seen that if, as shown in Figure 9, the face 14' is beneath a part of washer 13, washer 13' cannot be interlinked with washer 13. The distance between the end faces must be made small enough or the length of the segment large enough to bring about this condition, if entangling in this fourth manner is to be prevented, although it will be obvious that the chance of washers approaching in this manner is fairly remote.

It will be understood that, in varying the distance between the faces of the ends of the segment, it will be necessary to change the angle of cut of these faces correspondingly, so as to maintain them in such relation that they will not contact materially as the washer is compressed.

In Figures 12, 13 and 14, I have illustrated diagrammatically the manner in which the ends of a segment for a given washer may be laid out. The diagrams relate particularly to the washer shown in Figures 1 and 5, the ends of the segments being shown in the position of Figure 5, that is, with the axis of the helix turned so that the circumference can be projected on a horizontal line.

In constructing a washer of the section shown in Figure 1, if the projected circumference is first arbitrarily selected, then Figure 12 illustrates how the angle of the end faces can be determined. The point 32 is positioned in the vertical line A—B and on the lowermost face of the segment end 30. Then the point 33 in the upper face of the segment end 31 is positioned a selected distance, to the left of the vertical line A—B, so that the projected circumference will be more than 360°, as heretofore pointed out. In this particular case, this excess over 360° is comparatively small. Since in this particular case, the vertical height of the washer stock is the smallest dimension of the cross section and therefore the space between the ends of the washers must be not greater than this thickness, I have, for purposes of illustration, taken this thickness as the desired space between the end faces of the washer. Therefore, from the point 33, I strike the arc 34 on a radius equal to the height of the washer stock and then, through the point 32, draw a line tangent to the arc 34. This will determine the end face 35. Then, through the point 33, a line is drawn parallel to line 35, and this will determine the end face 36.

It will be found that, if it is desired to keep the projected circumference constant, then any increase in the angle between the lines 35 and 36 and the bottom and top surfaces of the washer, respectively, will decrease the distance between the end faces of the segment and, of course, any decrease in this angle will increase this distance. This I have illustrated by the dotted lines 37 and 38, which make steep angles with the bottom and top of the washer and thus narrow the space between the end faces. Similarly, dotted lines 39 and 40 have been drawn making relatively small angles with the bottom and the top of the washer and, for purposes of illustration, I have shown this angle so small that the space between lines 39 and 40 is so great that the washers would tangle. In other words, if the projected circumference is to remain constant, and the excess over 360° is comparatively small, then there will be a limiting angle beyond which the space between the end faces would be so great as to permit entangling.

In Figure 13, I have shown the determination of the angle of the end faces when the washer has a pitch greater than the thickness or height of the washer stock. It will be seen that this increase in the pitch does not materially affect the angles. As before, the point 41 is located in the vertical line A—B and on the lower face of the washer, and the point 42 is located on the upper face of the washer and a short distance to the left of the vertical line A—B, so that the projected circumference is somewhat more than 360°. Then from the point 42, the arc 43 is struck on a radius equal to the washer stock and the line 44 drawn through the point 41 tangent to the arc 43. Then the line 45 is drawn through the point 42 parallel to the line 44.

Instead of arbitrarily selecting the projected circumference, as was the case in Figures 12 and 13, it may, in some cases, be desirable to arbitrarily select the angle of the faces, and one construction of the end faces when this is done is illustrated in Figure 14. The point 46 is located in the vertical line A—B and in the lower surface of the washer, and the line 47 is drawn at the arbitrarily-selected angle which, in this case, is 45°. Then from the point 48, where the line 47 intersects the upper surface of the segment end 30, an arc 49 is struck on a radius equal to the height or thickness of the washer stock. The line 50 is then drawn tangent to this arc and parallel to the line 47, to define the end face of the segment end 31.

Similarly, in Figure 14, I have shown in dotted lines the construction if the arbitrarily-selected angle was 30°, and in this case, the dotted line 51 is drawn from the point 46 making an angle of 30° with the lower surface of the segment end 30. Then, from the point 52, the arc 53 is struck and the dotted line 54 drawn parallel to the dotted line 51 and tangent to the arc 53.

A comparison of the end faces shown in the full lines 47, 50, with the end faces shown in dotted lines 51, 54, shows that, if the angle is arbitrarily selected, the projected circumference of the washer will change correspondingly if the distance between the faces is the same in both cases, and, in general, the smaller the arbitrarily selected angle, the greater will be the projected circumference.

It will be understood that, in the diagrammatic representations of Figures 12, 13, and 14, I have been considering only the construction which will be necessary to prevent entangling either by the first or second methods referred to above. If it is desired to avoid entangling by the third and fourth methods as well, then, in certain cases, it will be necessary to make the distance between the end faces less than the smallest dimension of the washer stock and the diagrams of Figures 12, 13 and 14, will show that this can be accomplished, either by increasing the projected circumference and making the angle to correspond, or by changing the angle and making the projected circumference to correspond.

It will also be understood that, while the diagrams of Figures 12, 13, and 14, have been drawn to show the maximum distance permissible between the end faces, a distance less than this maximum distance may be used.

It will also be understood that the several features of my preferred form may be varied without departing from my invention. Thus, the washer stock may, if desired, have its edges rounded considerably so as to make the section more nearly approach a circle or an ellipse. The top and bottom faces of the washer, however, should have sufficient flat area to carry the pressure to which the washer may be subjected.

The angle of the end faces may be anything desired, but I prefer to make it 45° or greater with the top or the bottom of the washer stock, because thereby there is more stock in the washer for the same circumference and this increases the compression resistance of the washer.

While, in the forms illustrated, the lines of intersection between the end faces and the top and bottom of the washer (lines 19 and 20 in Figure 2 for instance) will, when extended, pass through or very close to the axis of the helix, this is not essential. The end faces may be cut so that such lines pass considerably to one side of the axis of the helix; that is, so that they will make large angles with the radius of the helix.

The pitch of the helix may be greater than that shown in Figures 1, 2, 3, and 4; that is, greater than the height or thickness of the washer stock. Such a construction is illustrated diagrammatically in Figure 13. This pitch should never be so great, however, that the distance between the end faces of the segment cannot be made less than the smallest dimension of the washer stock cross section.

It will be understood, of course, that, no matter what changes from the illustrative embodiments are introduced, the circumference of the segment must exceed 360°, the space between the faces must be not greater than the smallest dimension of the stock cross section, and, if the washers are to be non-entangling under any circumstances, the ends must have angles and distances between the faces which will prevent the passing of one washer into another when approached as in Figures 8 and 9.

What is claimed is:—

1. A compression spring washer of the split ring type formed of stock generally rectangular in cross section and comprising a helical segment more than 360° in circumference, the ends of the segment having opposed faces making angles with and intersecting the top and bottom of the washer stock throughout the width of the stock, said faces being spaced apart a substantial distance, said distance being less than the smallest dimension of the cross section of the stock and said faces being disposed relatively so that they will not contact materially as the washer is being flattened.

2. A compression spring washer of the split ring type formed of stock generally rectangular in cross section and comprising a helical segment more than 360° in circumference, the ends of the segment having opposed faces making angles with and intersecting the top and bottom of the washer stock throughout the width of the stock, said faces being spaced apart a substantial distance, said distance being less than the smallest dimension of the cross section of the stock and said faces being disposed relatively so that they will not contact materially as the washer is being flattened, said distance also being small enough to prevent the ends of two such washers passing each other when one of the end faces of one washer is in contact with the inside of the other washer opposite the space between the end faces of the latter.

In testimony whereof I affix my signature hereto.

CYRUS H. LOUTREL.